(No Model.)
B. F. KNAPP.
MACHINE FOR PULVERIZING SOD, MANURE, &c.
No. 473,421. Patented Apr. 19, 1892.
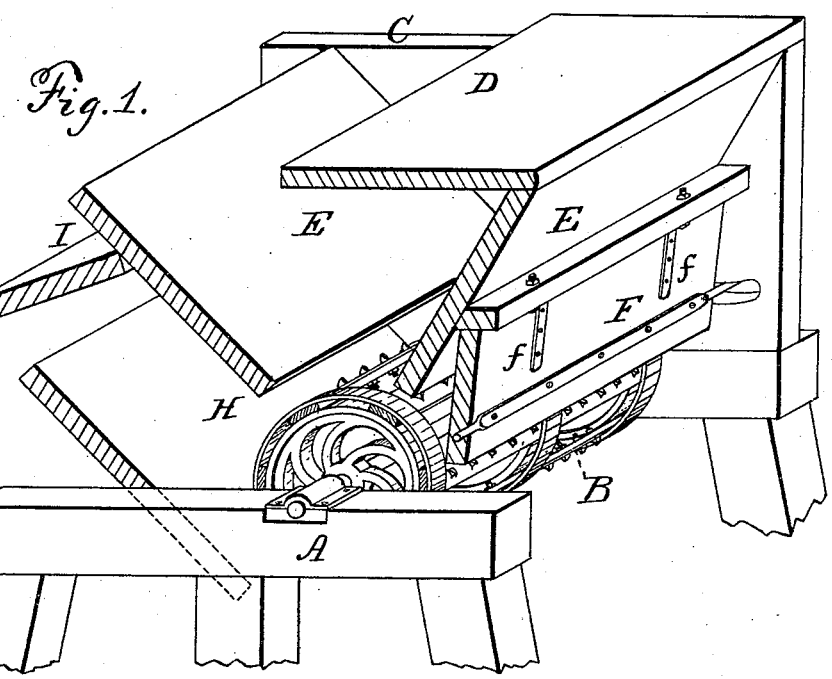
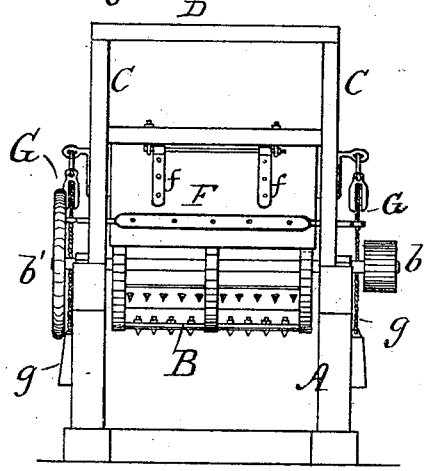
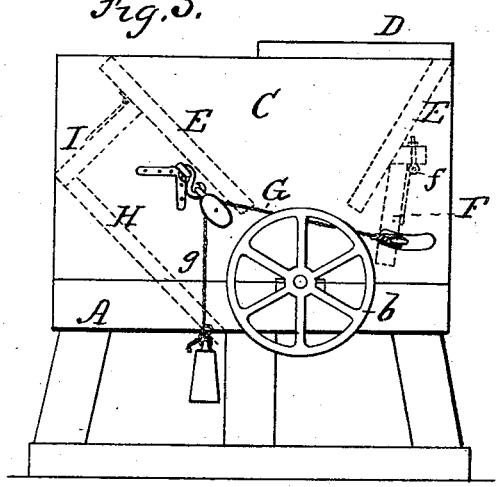
WITNESSES.
Benjamin F. Knapp
INVENTOR.

UNITED STATES PATENT OFFICE.

BENJAMIN F. KNAPP, OF MADISON, NEW JERSEY.

MACHINE FOR PULVERIZING SODS, MANURE, &c.

SPECIFICATION forming part of Letters Patent No. 473,421, dated April 19, 1892.

Application filed September 12, 1891. Serial No. 405,558. (No model.)

*To all whom it may concern:*

Be it known that I, BENJAMIN F. KNAPP, a citizen of the United States, residing at Madison, in the county of Morris and State of New Jersey, have invented a new and useful Improvement in Machines for Pulverizing Sods, Manure, &c., of which the following is a specification.

The object of my invention is to provide a simple and practical machine for reducing sods and manure to a fine condition; and in carrying out my invention I proceed as follows, reference being had to the accompanying drawings, forming a part hereof, wherein—

Figure 1 is a view in perspective and partial section of a machine for reducing sods, manure, &c., constructed according to my invention; Fig. 2, an end and Fig. 3 a side elevation of the same.

The letter A designates the frame of the machine, mounted upon which is a toothed cylinder B, the shaft of which bears at one end a band-pulley $b$, by which motion from an engine is communicated to said cylinder, and at the opposite end a fly-wheel $b'$.

C C designate the sides of the machine, and D the top thereof. The hopper to receive the material to be reduced is composed of the two inclined boards or bottom E E, at the rear lower edge of which is swung on hinges $f$ a door F, that is held to the cylinder by suitable springs or by a cord and pulley, as at G $g$, Figs. 2 and 3, and beneath the front portion of the hopper is arranged a similarly-inclined board H, closed by a lid I. The object of the swinging door F is to keep the sods, &c., in contact with the toothed cylinder, and because of the board H with lid I, stones are prevented from being thrown from the machine, and access to the cylinder for cleaning the same may be had.

The machine can be worked over or under shot, and it is intended for comminuting sods and manure, so that such material will be free of stones, clods, and lumps and will be in an available condition for applying to the soil as a fertilizer or for use in the grain-drill, either alone or in connection with guano, bone-dust, &c.

Having thus described my invention, I claim as new and desire to secure by Letters Patent—

In a machine for reducing sods, &c., in combination with a suitable frame and toothed cylinder mounted therein, the hopper composed of inclined bottom E E, sides C C, and lid D, door F, hinged to the rear lower edge of hopper-bottom and held in contact with the cylinder, inclined board H, and lid I, as described and shown, for the purposes specified.

BENJAMIN F. KNAPP.

Witnesses:
JOHN M. HAYNES,
WILLIAM R. PENNINGTON.